United States Patent
Karlin (10) Patent No.: US 12,495,303 B2
(45) Date of Patent: Dec. 9, 2025

(54) SYSTEMS AND METHODS FOR AUTHENTICATING A SUBSCRIBER WITHIN THE NETWORK CORE

(71) Applicant: DISH Wireless L.L.C., Englewood, CO (US)

(72) Inventor: Kevin Karlin, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 724 days.

(21) Appl. No.: 17/575,555

(22) Filed: Jan. 13, 2022

(65) Prior Publication Data

US 2023/0224713 A1    Jul. 13, 2023

(51) Int. Cl.
| | |
|---|---|
| *H04W 12/72* | (2021.01) |
| *H04W 12/06* | (2021.01) |
| *H04W 12/40* | (2021.01) |

(52) U.S. Cl.
CPC ........... *H04W 12/72* (2021.01); *H04W 12/06* (2013.01); *H04W 12/40* (2021.01)

(58) Field of Classification Search
CPC ...... H04W 12/06; H04W 12/40; H04W 12/72
See application file for complete search history.

(56) References Cited

U.S. PATENT DOCUMENTS

| | | | |
|---|---|---|---|
| 2015/0312301 A1* | 10/2015 | Dasher | H04L 1/0014 709/217 |
| 2017/0004503 A1* | 1/2017 | Yalamanchili | G07F 7/08 |
| 2021/0195411 A1 | 6/2021 | Ratnakaram et al. | |
| 2022/0114245 A1* | 4/2022 | Krishan | G06F 21/32 |

(Continued)

FOREIGN PATENT DOCUMENTS

WO    WO 2021138663 A1    7/2021

OTHER PUBLICATIONS

KR 20170130365 A, Van De Wtering Stephen James, Nov. 2017, Method and Systems for Persoanl Data Sharing Apps, pp. 1-14 (Year: 2017).*

(Continued)

*Primary Examiner* — Keith Ferguson
(74) *Attorney, Agent, or Firm* — Seed Intellectual Property Law Group LLP (57) ABSTRACT

A subscriber authentication system prevents a change from being applied to a subscriber account until the subscriber approves of the change at the network core. The subscriber authentication system identifies one or more subscriber accounts for a network, each subscriber account being associated with a subscriber. The subscriber authentication system receives an indication that a change is requested for a subscriber account. The subscriber authentication system receives, within a network core, authentication information and data indicating whether the change is to be made to the subscriber account. The subscriber authentication system authenticates, within the network core, that the data was received from the subscriber based on the authentication information. The subscriber authentication system causes the change to be made based on the data indicating whether the change is to be made and the result of the authentication.

19 Claims, 7 Drawing Sheets

(56) References Cited

U.S. PATENT DOCUMENTS

| | | | |
|---|---|---|---|
| 2022/0198054 A1* | 6/2022 | Picos | G06F 21/6245 |
| 2023/0171242 A1* | 6/2023 | Sethuraman | H04L 9/321 |
| | | | 713/168 |

OTHER PUBLICATIONS

International Search Report and Written Opinion, mailed Apr. 12, 2023, for International Patent Application PCT/US2023/060425. (14 pages).

Seon Technologies Ltd, Guide "Reducing Account Takeover Attacks (ATO)," URL:https://resources.cdn.seon.io/uploads/2021/10/ATO_guide_updated_version-1.pdf, pp. 1-18, Oct. 2021.

* cited by examiner

SYSTEMS AND METHODS FOR AUTHENTICATING A SUBSCRIBER WITHIN THE NETWORK CORE

BRIEF SUMMARY

Telecommunication networks, such as a 4G/5G network, include a variety of systems used by a subscriber to the network to change aspects of their subscriptions. Such changes typically must pass through multiple systems in the network to be recorded in the network core. However, bad actors are able to make or approve changes to a subscriber's account or aspects of the subscribers account through a multitude of methods, such as, porting a phone number to another Subscriber Identification Module ("SIM"), card illegal SIM swapping, social engineering, placing a member on the inside of the organization, gaining access to ancillary systems outside of the network core, or other methods of accessing or changing subscriber account information.

The embodiments disclosed herein address the issues above and thus help solve the above technical problems and improve the technology of telecommunication network cores by providing a technical solution that, within the network core, receives an indication from a subscriber that a change to their account is valid, along with authentication information used to authenticate the subscriber. Additionally, the embodiments disclosed herein are able to generate one or more authentication codes for the subscriber account and use the authentication codes to authenticate the subscriber. Furthermore, the embodiments described herein are able to cause a subscriber device to display a pending change to the subscriber account and authentication information generated for the subscriber.

In some embodiments, a subscriber authentication system identifies subscriber accounts for a network, receives an indication that a change is requested for a subscriber account, receives data indicating whether the change is to be made for the subscriber account within the network core, receives authentication information usable to authenticate that the data was received from the subscriber associated with the subscriber account within the network core, authenticates, within the network core, that the data was received from the subscriber based on the authentication information, and causes the change to be applied to the subscriber account based on the results of the authentication.

In some embodiments, a network core receives an indication that a change is requested for a subscriber account, receives data indicating that the change is to be made for the subscriber account, receives authentication information to authenticate that the data was received from the subscriber account, authenticates that the data was received from the subscriber account, and causes the change to be applied to the subscriber account based on the results of the authentication.

In some embodiments, a subscriber device receives an indication that a change is requested for a subscriber account associated with the subscriber device, displays the indication via a user interface, receives user input indicating whether the change is approved by the subscriber, receives authentication information identifying the subscriber, transmits the authentication information and the indication that the change is approved to a telecommunication network core, and receives from the telecommunication network core an indication of whether the change has been made to the subscriber account.

DETAILED DESCRIPTION

Network providers, such as telecommunication network providers, cellular network providers, etc., provide subscribers with the ability to make changes to their accounts, such as changing quality of service attributes, changing information regarding the owner of the account, changing contact information for the account owner, and other changes that can be made to a subscriber account. The typical method for a change to be made to the subscriber account would be for the subscriber to contact the network provider's customer service systems, such as by talking to a customer service representative or through a user interface, which then use an API communicate the change to the network core, or to another system such as an IT system that passes the change to the network core.

However, the network core, and each of the systems in between the customer service systems, assume that information which came from another system owned by the network provider is authentic and that a request for the change originated from the subscriber. As a result, a bad actor with access to any of the network systems, such as through hacking, social engineering, etc., is able to view or change subscriber account information. This can result in the bad actor taking control of the subscriber's bank accounts, social media accounts, crypto wallets, and access any other digital information or account accessible by the subscriber device. One such way bad actors are able to take control is by utilizing "illegal SIM swapping," in which the bad actor alters the subscriber's account such that their phone number is "ported" to a SIM card other than the SIM card in the subscriber device.

Furthermore, although network providers typically require a subscriber to provide a password or PIN code to change account information, these are typically provided to a customer service system or representative. Thus, a bad actor with access to the system, or who has influence over the representative, can make the change without the subscriber's password or PIN code because the network assumes that any change coming from another network system is valid. Additionally, the bad actor may be able to guess the subscriber's PIN code or password and gain access and control over the subscriber's account anyway.

The embodiments disclosed herein help solve the above technical problems and improve the technology of telecommunication network cores by providing a technical solution that, within the network core, receives an indication from a subscriber that a change to their account is valid, along with authentication information used to authenticate the subscriber. In some embodiments, the subscriber authentication system generates one or more authentication codes for a subscriber account and uses the authentication codes to authenticate the subscriber. In some embodiments, the subscriber authentication system causes a subscriber device to display a pending change to the subscriber account, as well as authentication information generated for the subscriber.

In some embodiments, the subscriber authentication system receives an indication that an aspect of a subscriber account is to be changed. The subscriber authentication system may receive the indication that the aspect of the subscriber account is to be changed from a network system or device. The subscriber authentication system may receive the indication that the aspect of the subscriber account from a device controlled or operated by a subscriber indicated by the subscriber account, such as the account owner, a user of the subscriber account, etc. The subscriber authentication system may receive the indication that an aspect of the subscriber account is to be changed via a user interface. The user interface may be presented to a user by a device controlled or operated by the subscriber.

In some embodiments, the subscriber authentication system receives data indicating whether the change is approved for the subscriber account. The subscriber authentication system may receive the data indicating that the change is approved from a device controlled or operated by the subscriber (a "subscriber device"). The subscriber authentication system may cause a user interface to be presented on the subscriber device. The subscriber authentication system may receive user input from the user interface indicating whether the change to the subscriber account is approved.

In some embodiments, the subscriber authentication system receives authentication information usable to authenticate that the data was received from the subscriber. The subscriber authentication system may receive the authentication information from the subscriber device. The subscriber device may receive the authentication information via user input. The subscriber authentication system may receive the authentication information from a device controlled or operated by the subscriber which is not the subscriber device. The authentication information may include one or more of: a passphrase, a PIN code, a software token, a hardware token, a security question, and other means of authenticating a user.

In some embodiments, the authentication information is received after the subscriber authentication system receives the data indicating whether the change is approved. In some embodiments, the authentication information may be included in the data indicating whether the change is approved.

In some embodiments, the subscriber authentication system changes the authentication information required to authenticate the subscriber after a predetermined time period has elapsed. For example, the subscriber authentication system may change a PIN code required to authenticate the user after a certain amount of time has elapsed, such that the original PIN code cannot be used to perform the authentication.

In some embodiments, the subscriber authentication system authenticates that the data was received from the subscriber associated with the subscriber account by using the authentication information. The subscriber authentication system may authenticate the data was received from the subscriber by determining whether an authentication code or token is included in the authentication information. The subscriber authentication system may authenticate that the data was received from the subscriber by performing two-factor authentication. In embodiments where the subscriber authentication system performs two-factor authentication, the subscriber authentication system may cause the network core to receive additional authentication information from the subscriber device, from another subscriber device, etc.

In some embodiments, the subscriber authentication system causes the change to be applied to the subscriber account based on the result of the authentication of the subscriber and the data indicating whether the change is to be made for the subscriber account. Thus, the change is not made to the subscriber account until the subscriber has approved the change and the subscriber authentication system has authenticated that the approval was received from the subscriber.

In some embodiments, the subscriber authentication system generates one or more authentication codes for the subscriber account. The subscriber authentication system may indicate the one or more authentication codes to the subscriber, such as by causing the subscriber device to display the codes. The subscriber authentication system may authenticate that the data was received from the subscriber based on a comparison of the generated authentication codes to the authentication information. The authentication codes may be one or more of: temporary codes, such that the codes cannot be used after a predetermined time period has elapsed, after being used a predetermined number of times, etc.; one-time use codes, such that each code can only be used once before it becomes invalid; etc.

In some embodiments, the subscriber authentication system receives an indication that the subscriber account is to be secured. The subscriber authentication system may generate authentication information for the subscriber account in response to receiving the indication that the account is to be secured. The subscriber authentication may cause a subscriber device to display the authentication information.

In some embodiments, when a change is requested to be made to a subscriber account the subscriber authentication system determines whether the subscriber account is secured, and, based on the determining, the subscriber authentication system prevents the change from being made to the subscriber account until the subscriber has provided an indication that they approve of the change and authentication information authenticating that the approval of the change came from the subscriber.

In some embodiments, a telecommunication network core receives the indication that a change is requested for a subscriber account. The telecommunication network core may receive data indicating that the change is to be made for the subscriber account. The telecommunication network core may receive authentication information usable to authenticate that the data was received from the subscriber associated with the subscriber account. The telecommunication network core may authenticate that the data was received from the subscriber based on the authentication information. The telecommunication network core may cause the change to be applied to the subscriber account based on the results of the authentication and the indication of whether the change is to be made.

In some embodiments, the telecommunication network core communicates directly with the subscriber device, such as to receive the data indicating that the change is to be made to the user account, receive the authentication information, receive an indication that the subscriber account is to be secured, to transmit data indicating one or more authentication codes, to indicate that the change has been made to the subscriber account, etc.

In some embodiments, the telecommunication network core generates authentication information for the subscriber account.

In some embodiments, a subscriber device receives an indication that a change is requested for a subscriber account associated with the subscriber device. The subscriber device may display the indication that the change is requested via a user interface. The subscriber device may receive, via the user interface, user input indicating whether the change is approved. The subscriber device may receive, via the user interface, user input indicating authentication information identifying the subscriber. The subscriber device may transmit, to the telecommunication network core, the indication of whether the change is approved and the authentication information. The subscribe device may receive, from the telecommunication network core, an indication of whether the change has been made to the subscriber account. Therefore, by receiving the authentication information, the subscriber authentication system is able to determine whether the user response is valid. For example, a secure element of the SIM card may be leveraged to store a key which is "known" only to the SIM card and the telecommunication network core. When the subscriber device transmits the indication that the change is approved, it may also transmit the key. The network core, upon receiving the key, determines whether additional authentication is required and requests the additional authentication from the subscriber device. Thus, in this example, the account would not be compromised even if the subscriber device was temporarily in the hands of a person other than the subscriber associated with the subscriber account, and the other person, in addition to any potential bad actors, would not be able to confirm a change to the subscriber account.

In some embodiments, the subscriber device receives an indication that the subscriber account is to be secured by the telecommunication network core, such as via a user interface. The subscriber device may transmit the indication that the subscriber account is to be secured to the telecommunication network core. The subscriber device may receive authentication information from the telecommunication network core. The subscriber device may display the authentication information via the user interface.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
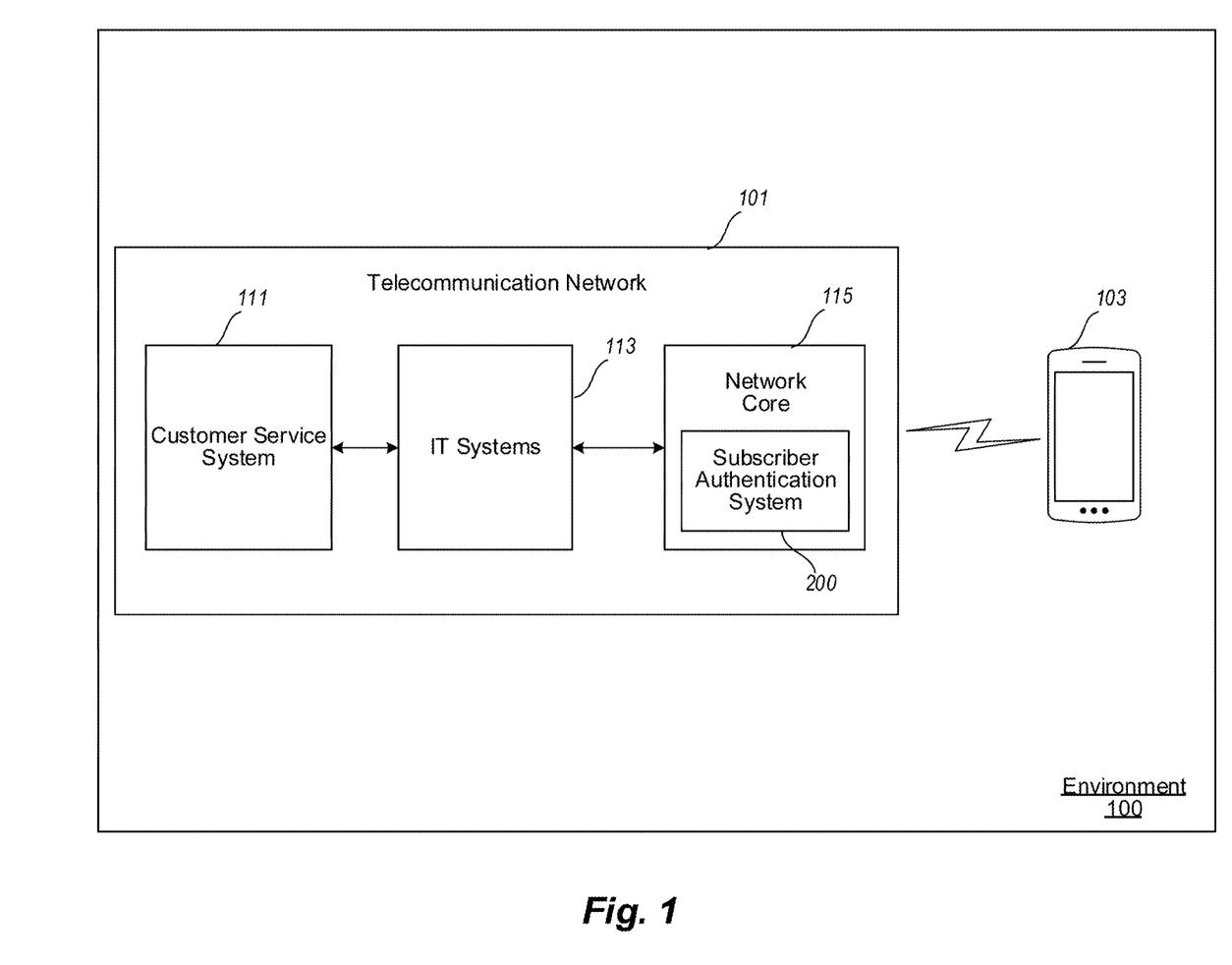
FIG. 1 is a diagram depicting an example environment in which subscriber authentication system is implemented.

FIG. 1 is a diagram depicting an example environment in which subscriber authentication system is implemented. It is to be appreciated that FIG. 1 illustrates just one example of an environment 100 and that the various embodiments discussed herein are not limited to the use of such an environment. The environment 100 includes a telecommunication network 101 and a subscriber device 103. The telecommunication network 101 includes a customer service system 111, IT systems 113, and a network core 115. The network core 115 includes a subscriber authentication system 200. The subscriber device 103 may communicate with the customer service system 111, the IT systems 113, and the network core 113.

The telecommunication network 100 is a network, communication system, or networked system (not shown), to which the subscriber device 103, customer service system 111, IT systems 113, and network core 115, may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more subscriber devices, such as PCs, tablets, laptop computers, smartphones, personal assistants, Internet connection devices, wireless LAN, WiFi, Worldwide Interoperability for Microwave Access (WiMax) devices, or the like, may be communicatively coupled to the network and/or to each other so that the plurality of subscriber devices are communicatively coupled together. Thus, such a network enables the subscriber device 103, customer service system 111, IT systems 113, and network core 115, and other subscriber devices, used as part of the subscriber authentication system, to communicate with each other.

The subscriber device 103 may include devices such as cellular telephones, smartphones, tablets, personal computers, laptop computers, wireless peripheral devices such as headphones, microphones, mice, keyboards, etc., security cameras, Internet of Things (or "smart") devices, televisions, smart televisions, smart television devices-such as FireTV, Roku, AppleTV, etc.,—routers, digital assistants, personal assistant devices-such as Amazon Alexa, Google Home, etc.,—drones, etc. The subscriber device 103 may interconnect to one or more communications media or sources, such as routers, network switches, modems, etc., to transmit communications to other devices. The subscriber device 103 may be associated with a subscriber account managed by the telecommunication network 101.

The customer service systems 111 include systems used by the telecommunication network 101 and the telecommunication network owner to interact with and change subscriber accounts on the behalf of subscribers. The customer service systems 111 may include computing devices accessed by customer service representatives, computing devices used to host user interface that a subscriber can use to change or access their account information, etc.

The IT systems 113 include systems used by the telecommunication network 101 and the telecommunication network owner to protect subscriber account information and information related to the telecommunication network.

The network core 115 includes network functions used to allow subscriber devices to access the telecommunication network 101 and communicate with other devices. The network core 115 additionally includes provisioning functions used to prepare the telecommunication network 101 to provide network functionality to the subscriber device 103. The provisioning functions are also able to be used to change attributes of the subscriber account, such as quality of service attributes, which SIM cards or devices are included in the subscriber account, etc. Additionally, the network core 115 includes functions which can be used to identify a SIM card or other subscriber identifier belonging to a subscriber account. Thus, the network core 115 is able to identify whether data was received from a subscriber device based on the SIM card or subscriber identifier. The network core 115 additionally includes a subscriber authentication system 200, which is described further with regards to FIG. 2. The subscriber authentication system 200 is able to authenticate that data has been received from a subscriber account separately from the functions used to identify a SIM card or other subscriber identifier. Thus, the network core 115, when used together with the subscriber authentication system 200, is able to authenticate the subscriber on the network level (i.e. by using the SIM card or subscriber identifier) as well as on the subscriber level (i.e. by using the subscriber authentication system).

The above description of the environment 100, and the various devices and functions therein, is intended as a broad, non-limiting overview of an example environment in which various embodiments of a subscriber authentication system can operate. The environment 100, and the various devices therein, may contain other devices, systems and/or media not specifically described herein. The environment 100, and the various functions therein, may contain other functions, systems and/or media not specifically described herein.

Example embodiments described herein provide applications, tools, data structures and other support to implement systems and methods for authenticating a subscriber within a network core and causing a change to occur to the subscriber account. The example embodiments described herein additionally provide applications, tools, data structures and other support to implement systems and methods for securing a subscriber account and generating authentication information for the subscriber account. Other embodiments of the described techniques may be used for other purposes, including for changing authentication information required to authenticate a subscriber. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
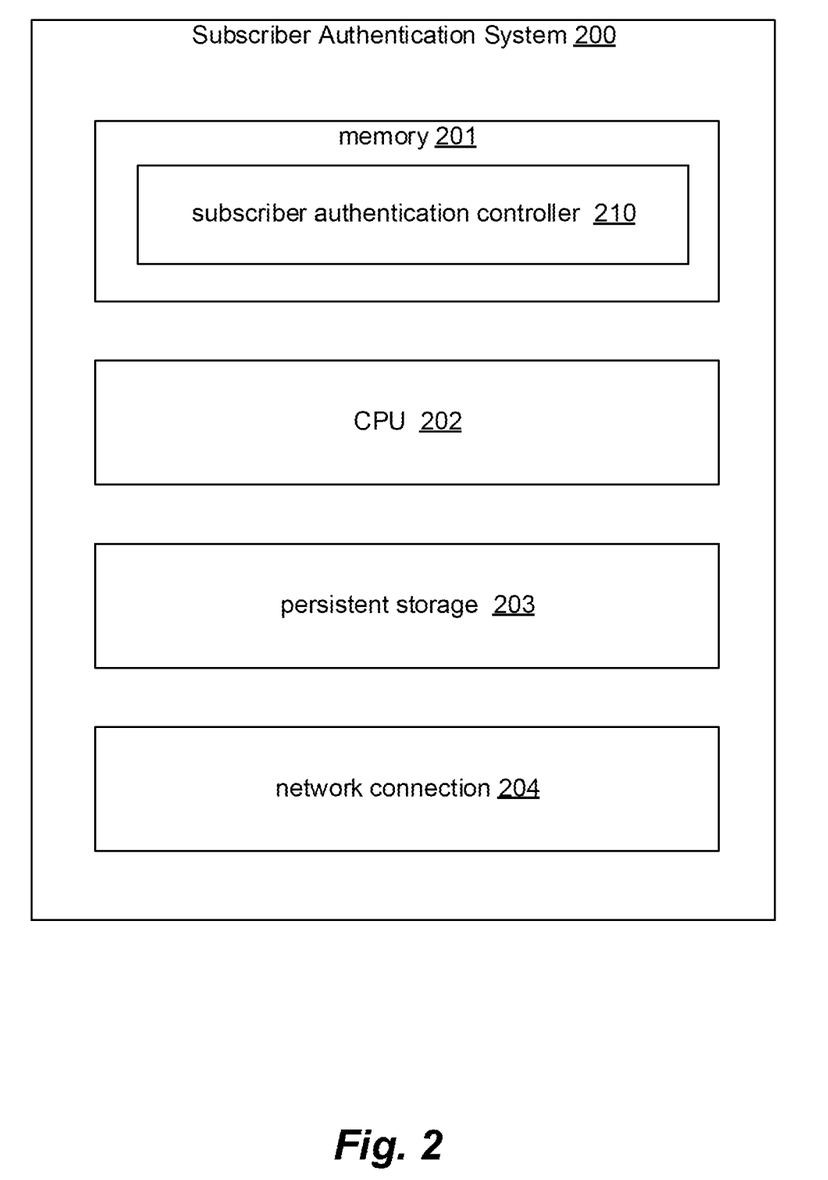
FIG. 2 is a block diagram depicting example components incorporated in an subscriber authentication system, according to various embodiments described herein.

FIG. 2 is a block diagram depicting example components incorporated in an subscriber authentication system 200, according to various embodiments described herein. In various embodiments, the subscriber authentication system 200 includes one or more of the following: a computer memory 201 for storing programs and data while they are being used, including data associated with the telecommunication network 101, subscriber device 103, customer service systems 111, IT systems 113, network core 115, an operating system including a kernel, and device drivers; a central processing unit (CPU) 202 for executing computer programs; a persistent storage device 203, such as a hard drive or flash drive for persistently storing programs and data; and a network connection 204 for connecting to one or more computer devices, the subscriber device 103, the customer services systems 111, the IT systems 113, the network core 115, other systems in the telecommunication network, and/or other computer systems, to send and/or receive data, such as via the Internet or another network and associated networking hardware, such as switches, routers, repeaters, electrical cables and optical fibers, light emitters and receivers, radio transmitters and receivers, and the like. In various embodiments, the subscriber authentication system 200 additionally includes input and output devices, such as a keyboard, a mouse, display devices, etc. In some embodiments, all or part of the subscriber authentication system 200 is included in the network core 115.

While an subscriber authentication system 200 configured as described may be used in some embodiments, in various other embodiments, the subscriber authentication system 200 may be implemented using devices of various types and configurations, and having various components. The memory 201 may include a subscriber authentication controller 210 which contains computer-executable instructions that, when executed by the CPU 202, cause the subscriber authentication system 200 to perform the operations and functions described herein. For example, the programs referenced above, which may be stored in computer memory 201, may include or be comprised of such computer-executable instructions. The memory 201 may also include data regarding subscriber accounts.

The subscriber authentication controller 210 performs the core functions of the subscriber authentication system 200, as discussed herein and also with respect to FIGS. 3 through 7. In particular, the subscriber authentication controller 210 authenticates that data received from a subscriber device accepting a change to the subscriber account was received from the subscriber. Additionally, the subscriber authentication controller 210 may generate or manage authentication codes and authentication information for the subscriber.

In an example embodiment, the subscriber authentication controller 210 and/or computer-executable instructions stored on memory 201 of the subscriber authentication system 200 are implemented using standard programming techniques. For example, the subscriber authentication controller 210 and/or computer-executable instructions stored on memory 201 of the subscriber authentication system 200 may be implemented as a "native" executable running on CPU 202, along with one or more static or dynamic libraries. In other embodiments, the subscriber authentication controller 210 and/or computer-executable instructions stored on memory 201 of the subscriber authentication system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the subscriber authentication system 200.

In addition, programming interfaces to the data stored as part of the subscriber authentication controller 210 can be available by standard mechanisms such as through C, C++, C#, Java, and Web APIs; libraries for accessing files, databases, or other data repositories; through scripting languages such as JavaScript and VBScript; or through Web servers, FTP servers, or other types of servers providing access to stored data. The subscriber authentication controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of subscriber authentication system 200, telecommunication network 101, subscriber device 103, customer service systems 111, IT systems 113, and network core 115.

Furthermore, in some embodiments, some or all of the components/portions of the subscriber authentication controller 210, and/or functionality provided by the computer-executable instructions stored on memory 201 of the subscriber authentication system 200 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Figure 3:
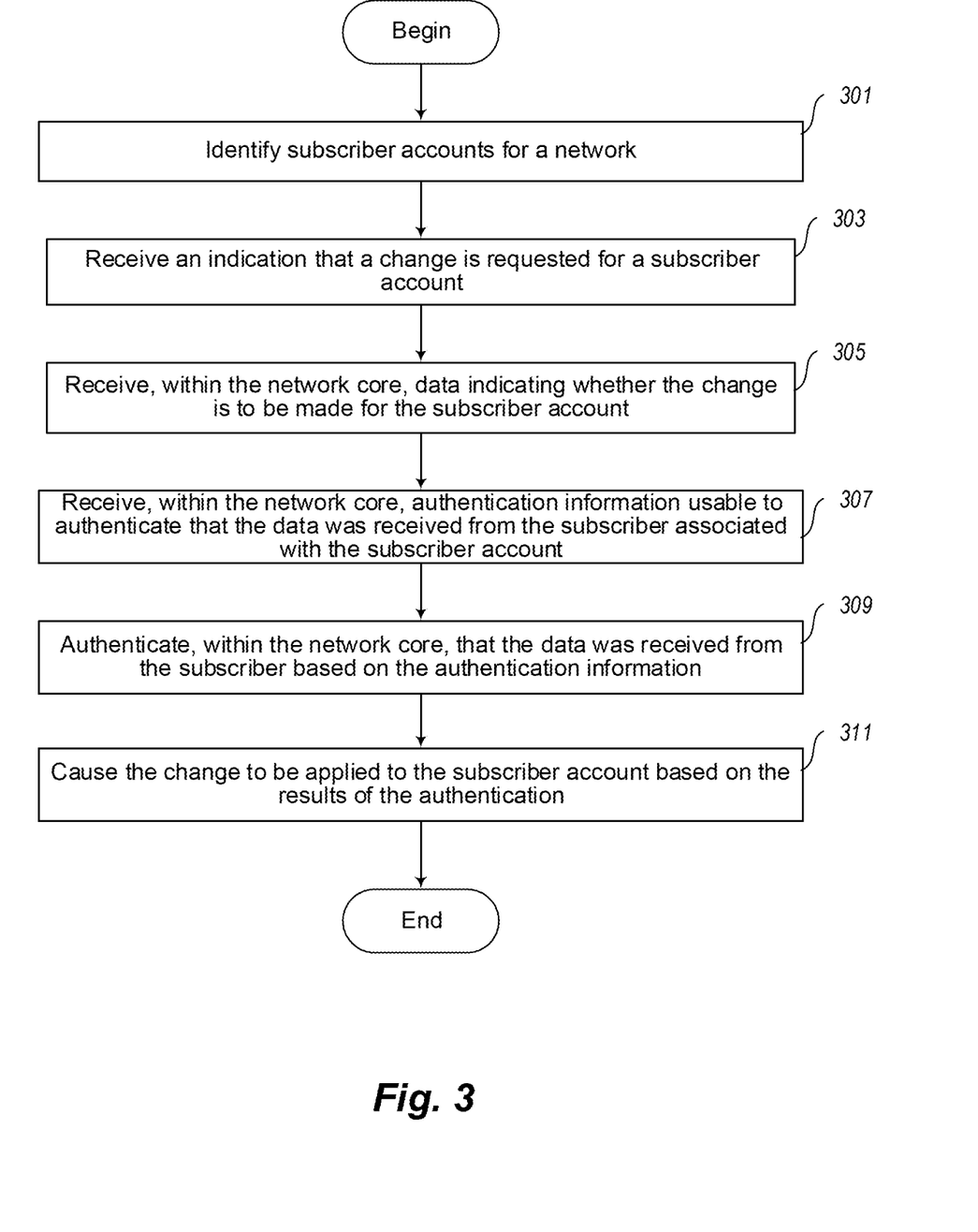
FIG. 3 is a flow diagram depicting a process to change a subscriber account after authenticating that the change has been approved by the subscriber, according to various embodiments described herein.

FIG. 3 is a flow diagram depicting a process to change a subscriber account after authenticating that the change has been approved by the subscriber, according to various embodiments described herein. At act 301, the subscriber authentication system identifies one or more subscriber accounts for a network. In some embodiments, each of the subscriber accounts is associated with a subscriber.

At act 303, the subscriber authentication system receives an indication that a change is requested for a subscriber account. The indication that a change is requested for the subscriber account may be received from a network system, such as a customer service system 111, IT system 113, or other network system (not shown). The indication that a change is requested for the subscriber account may be received from a device operated by the subscriber. The indication that a change is requested for the subscriber account may be received from a device operated by a "bad actor" who is trying to access or change the subscriber account.

At act 305, the subscriber authentication system receives, within the network core, data indicating whether the change is to be made for the subscriber account. The data indicating whether the change is to be made for the subscriber account may be received from the subscriber device. At act 307, the subscriber authentication system receives, within the network core, authentication information usable to authenticate that the data was received from the subscriber associated with the subscriber account.

At act 309, the subscriber authentication system authenticates, within the network core, that the data was received from the subscriber based on the authentication information. The authentication may be performed by using a passcode, PIN, token, security question, or another method of performing user authentication, included in the authentication information. The authentication may be performed by using two-factor authentication, such as by requiring two or more types of authentication information, requesting that a subscriber affirm that they sent the authentication through an email address, text message, phone call, push notification, etc., or another method of performing two-factor authentication.

In some embodiments, the subscriber authentication system may accept multiple types of authentication information to authenticate the subscriber. For example, the subscriber may have access to a hardware token and a one-time use authentication code. The subscriber authentication system may then authenticate the user based on the hardware token or the authentication code, thereby allowing the user to be authenticated even if they lose the hardware token.

In some embodiments, the subscriber authentication system receives authentication information from the subscriber device multiple times. For example, the subscriber device may send authentication information to the subscriber authentication system and send additional authentication information at a later time. In such an example, the subscriber authentication system may authenticate the subscriber based on the authentication information, then request the additional authentication information as an extra layer of security.

At act 311, the subscriber authentication system causes the change to be applied to the subscriber account based on the results of the authentication and the data indicating whether the change is to be made for the subscriber account.

As a non-limiting example, if the data indicated that the change was to be made for the subscriber account, but the subscriber authentication system was unable to authenticate that the data was received from the subscriber by using the authentication information, the subscriber authentication system would not cause the change to be made. Likewise, if the subscriber authentication system was able to authenticate that the data was received from the subscriber by using the authentication information, the subscriber authentication system would cause the change to be made. In some embodiments, the subscriber authentication system causes the network core to make the change to the subscriber account.

After act 311, the process ends.

In some embodiments, the authentication information includes additional data regarding whether the subscriber has authorized the change, such as location data, time data, or other data elements that could be persisted and confirmed by a network core or the subscriber authentication system either in lieu of, or in addition to, an authentication password, token, etc. For example, the subscriber authentication system may use the additional information to determine whether the change was authorized: in a location that the subscriber device is not typically at; at a time that the subscriber device is not typically active; at an abnormal hour as determined by data related to the time the subscriber device is typically in use, the location of the subscriber device, typical times that the subscriber requests changes to their data, or other data used to determine that the device is in use at an abnormal hour; a time or location that the subscriber or network provider have specified are abnormal; or other data useful to determine that an authorization for a change is valid. The subscriber authentication system may then accept or deny the change request based on the additional information and the password, token, or other authentication information provided to the subscriber authentication system. Thus, in this example, if the subscriber authentication system determines that the change was authorized from an abnormal location, it may reject the change even if a correct password is input into the subscriber device.

The additional data may be defined by a subscriber via user input. The subscriber authentication system may generate the additional data based on data related to the subscriber account, subscriber device, etc. The subscriber authentication system may use one or more of machine learning models, artificial intelligence systems, statistical analysis, or other tools or methods for interpreting or analyzing data in order to generate the additional data.

In some embodiments, the subscriber device is included in a group of devices associated with a particular organization, such as a corporation, charity organization, government organization, etc., (collectively "enterprise systems"). The subscriber authentication system may interact with one or more computing devices included in an enterprise system to authorize a change for the subscriber account associated with the subscriber device. For example, an administrator of an enterprise system may determine that a specific subscriber device should be allowed to have a higher data cap. The administrator may make the change to the account associated with the subscriber device, and the subscriber authentication system may request approval of the change and authentication information confirming the change from a computing device associated with the enterprise system which is different than the subscriber device.

Figure 4:
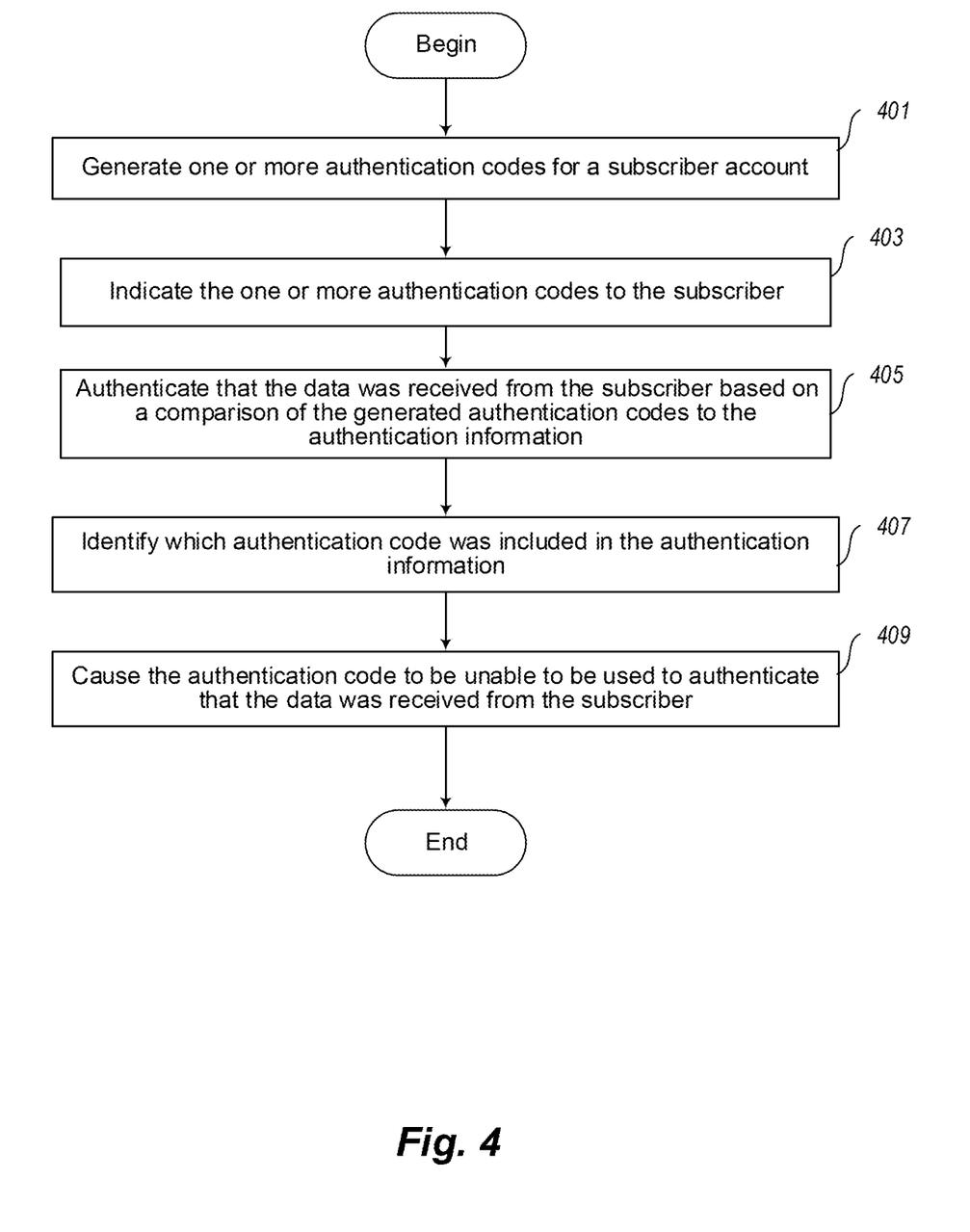
FIG. 4 is a flow diagram depicting a process to generate authentication codes for subscriber account, according to various embodiments described herein.

FIG. 4 is a flow diagram depicting a process to generate authentication codes for subscriber account, according to various embodiments described herein. At act 401, the subscriber authentication system generates one or more authentication codes for a subscriber account. The authentication codes may be PIN codes, tokens, alpha-numeric codes, or other types of authentication codes. In some embodiments, the subscriber authentication system generates multiple types of authentication codes.

At act 403, the subscriber authentication system indicates the one or more authentication codes to the subscriber. The subscriber authentication system may cause a subscriber device to display the authentication codes to the subscriber.

At act 405, the subscriber authentication system authenticates that the data was received from the subscriber based on a comparison of the generated authentication codes to the received authentication information. At act 407, the subscriber authentication system identifies which authentication code was included in the authentication information.

At act 409, the subscriber authentication system causes the authentication code to be unable to be used in the future to authenticate that the data was received from the subscriber. In some embodiments, where the authentication code is a limited multi-use code, the subscriber authentication system tracks how many times the code has been used and causes eth code to be unable to be used after a predetermined number of uses. In some embodiments, the authentication code is not a limited use code, and the subscriber authentication system does not perform step 409.

After act 409, the process ends.

Figure 5:
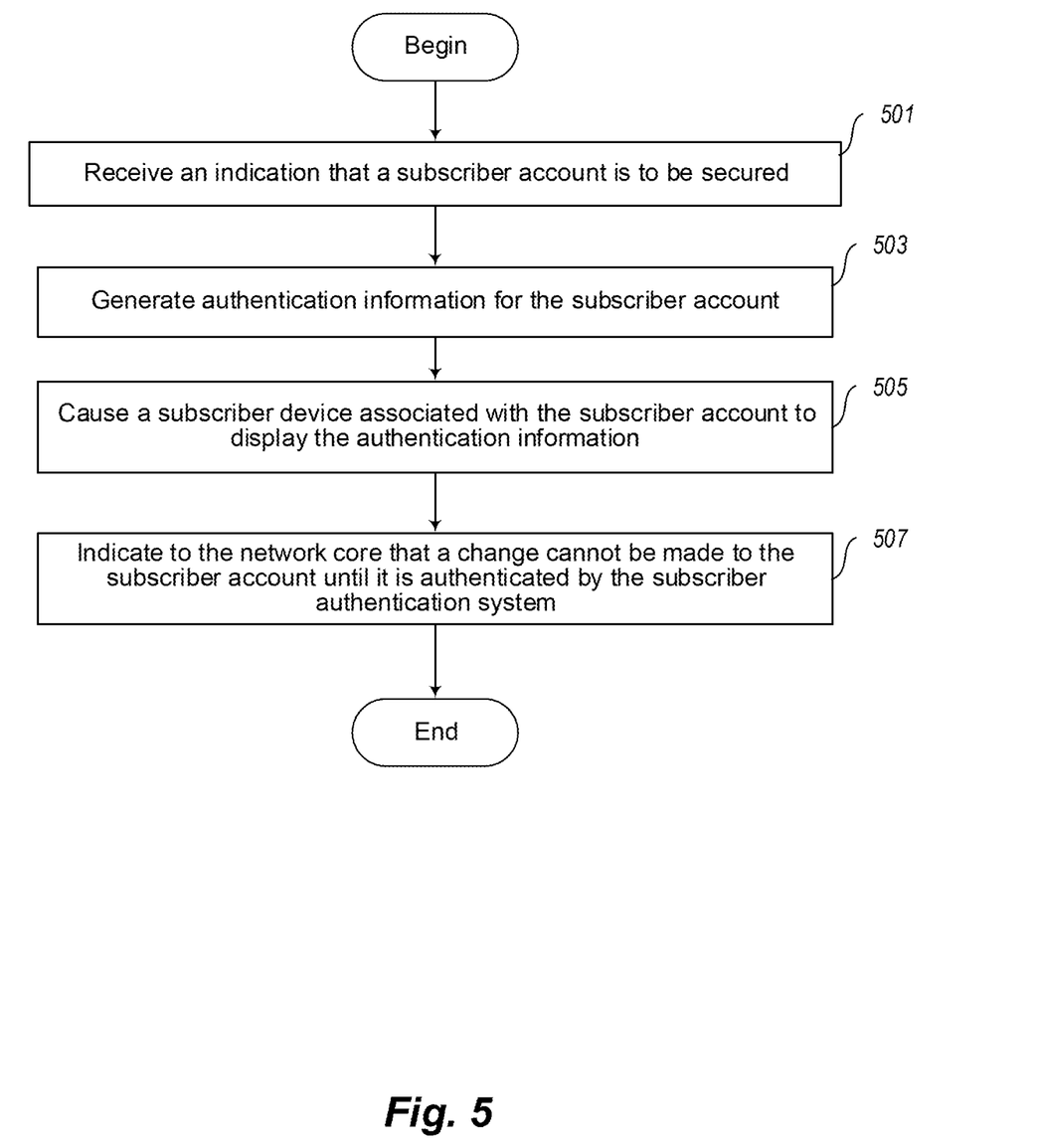
FIG. 5 is a flow diagram depicting a process to secure a subscriber account with the subscriber authentication system, according to various embodiments described herein.

FIG. 5 is a flow diagram depicting a process to secure a subscriber account with the subscriber authentication system, according to various embodiments described herein. At act 501, the subscriber authentication system receives an indication that a subscriber account is to be secured. The indication that a subscriber account is to be secured may be received from a subscriber device, a customer service system or other network system, etc.

At act 503, the subscriber authentication system generates authentication information for the subscriber account. The generated authentication information may include one or more generated authentication codes. In some embodiments, at least a portion of the authentication information may be obtained from the subscriber, such as via user input.

At act 505, the subscriber authentication system causes a subscriber device associated with the subscriber account to display the authentication system. At act 507, the subscriber authentication system indicates to the network core that a change cannot be made to the subscriber account until the change is authenticated by the subscriber authentication system. In some embodiments, the authentication by the subscriber authentication system is performed by using the process described in FIG. 3.

After act 507, the process ends. In some embodiments, the subscriber account authentication system does not perform the processes depicted in FIGS. 3 and 4 for a subscriber account until the subscriber authentication system performs the process described in FIG. 5.

Figure 6:
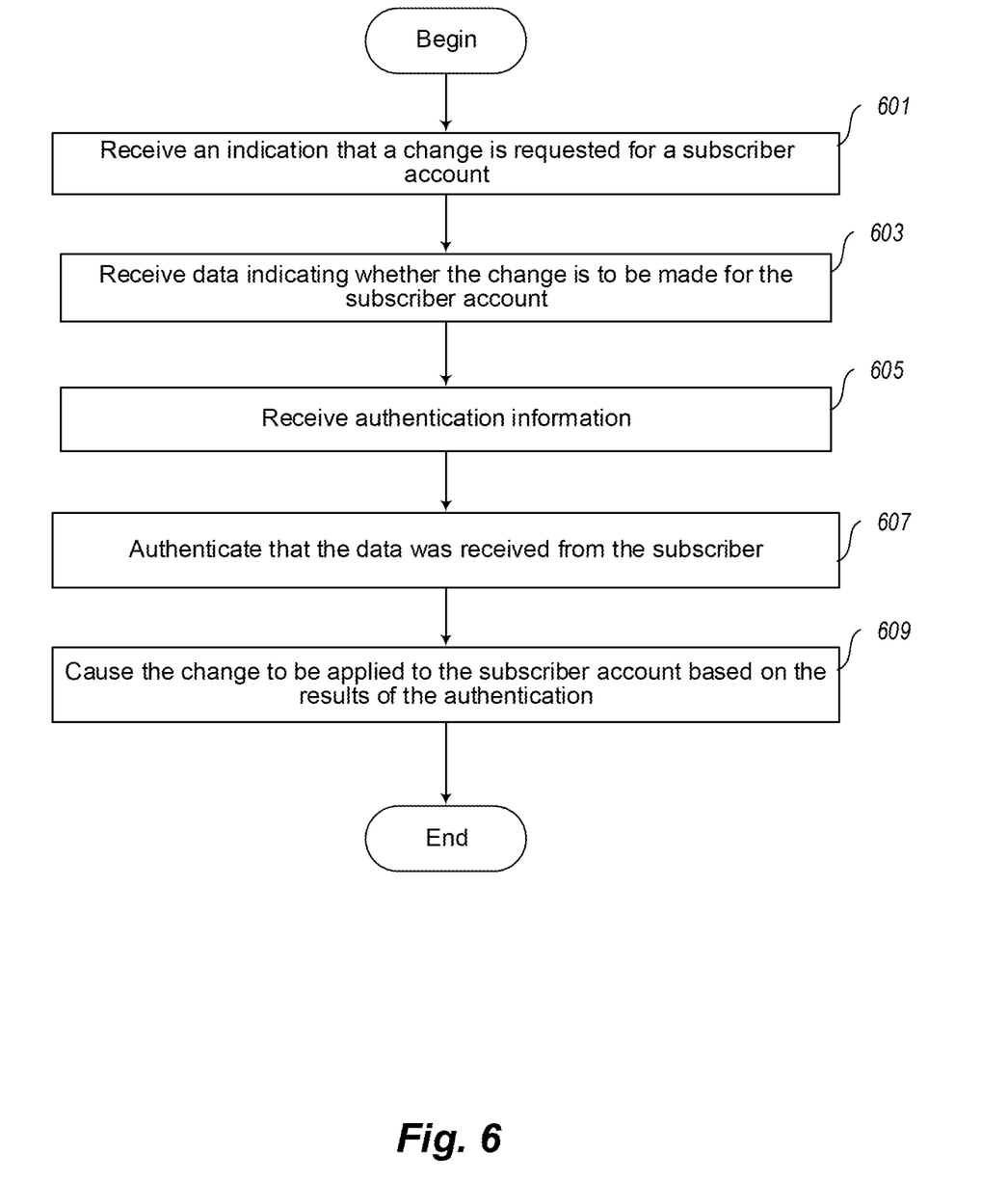
FIG. 6 is a flow diagram depicting a process to use a subscriber authentication system within a network core, according to various embodiments described herein.

FIG. 6 is a flow diagram depicting a process to use a subscriber authentication system within a network core, according to various embodiments described herein. At act 601, the network core receives an indication that a change is requested for a subscriber account. The indication that a change is requested may be obtained from a subscriber device, a customer service system or other network system, etc.

At act 603, the network core receives data indicating whether the change is to be made for the subscriber account. The data indicating whether the change is to be made for the subscriber account may be received from a subscriber device, another device operated by the subscriber which is not associated with the subscriber account, a device controlled by a "bad actor," or another device.

At act 605, the network core receives authentication information. The authentication information may be received from the subscriber device, another device operated by the subscriber, etc. In some embodiments, the network core receives the authentication information and the data indicating whether the change is to be made at the same time. In some embodiments, the network core receives the authentication information after receiving the data indicating whether the change is to be made.

At act 607, the network core uses the subscriber authentication system to authenticate that the data was received from the subscriber.

At act 609, the network core causes the change to be applied to the subscriber account based on the results of the authentication.

After act 609, the process ends.

Figure 7:
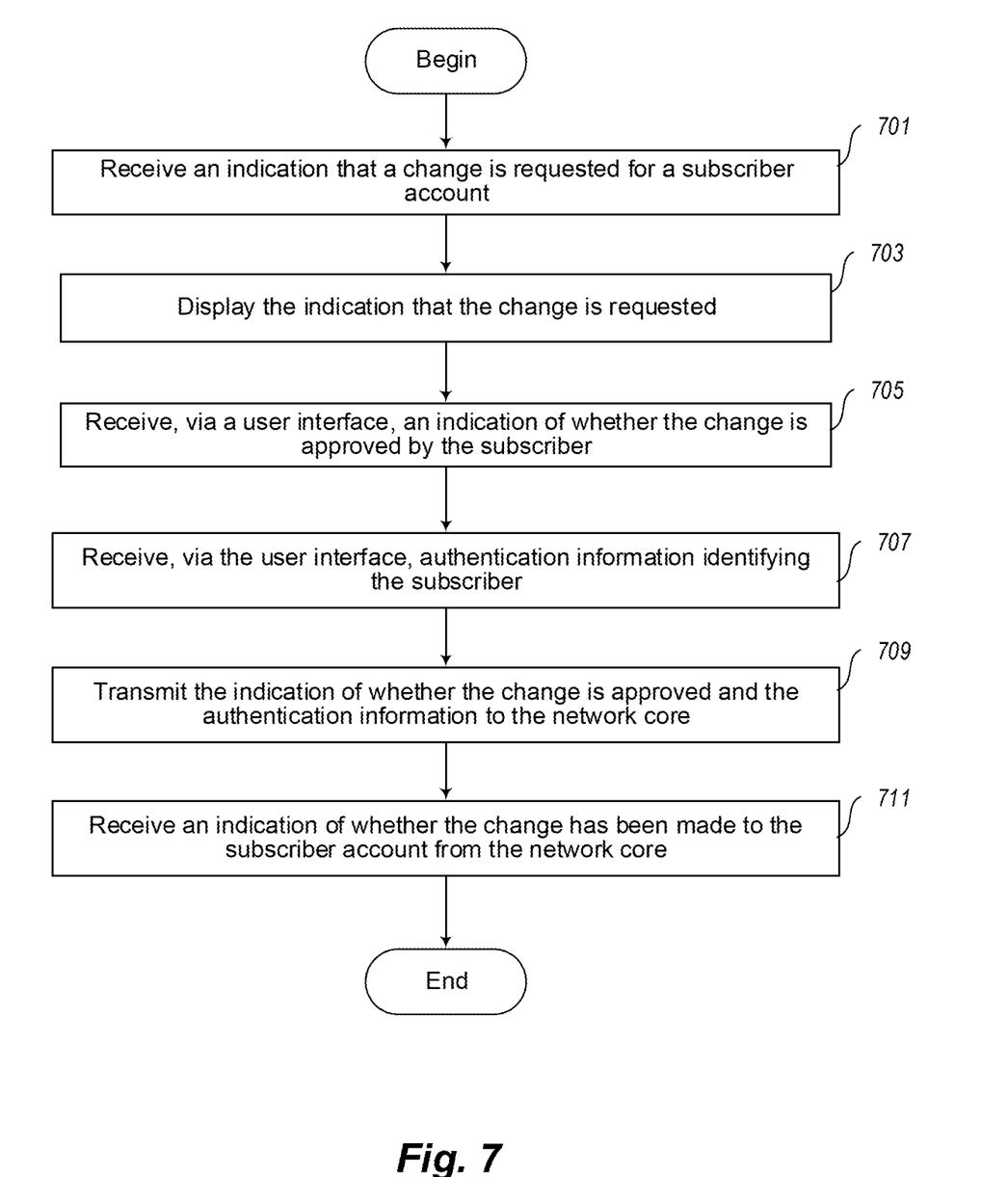
FIG. 7 is a flow diagram depicting a process to accept a change to a subscriber account by using a subscriber device, according to various embodiments described herein.

FIG. 7 is a flow diagram depicting a process to accept a change to a subscriber account by using a subscriber device, according to various embodiments described herein. At act 701, a subscriber device receives an indication that a change is requested for a subscriber account associated with the subscriber device.

At act 703, the subscriber device displays the indication that the change is requested. The subscriber device may display the indication that the change is requested via a user interface.

At act 705, the subscriber device receives, via the user interface, an indication of whether the change is approved by the subscriber. At act 707, the subscriber device receives, via the user interface, authentication information identifying the subscriber.

At act 709, the subscriber device transmits the authentication information and the indication of whether the change is approved to the network core. The subscriber device may transmit the authentication information and the indication of whether the change is approved separately. The subscriber device may transmit the authentication information and the indication of whether the change is approved at the same time.

At act 711, the subscriber device receives an indication of whether the change has been made to the subscriber account from the network core.

After act 711, the process ends.

In some embodiments, the subscriber device includes a mechanism for securing SMS based tokens included in the authentication information. The subscriber device may use a private key to encrypt a value before transmitting the value to the subscriber authentication system. The subscriber authenticator system may decrypt the value with it's own key and confirm to the subscriber device that the value was sent. The key may be generated when the subscriber account is created, after a subscriber requests to secure their account, etc. The key may be stored on the device or in a secure element of the SIM card and may be accessed via an applet on the SIM card or an application on the subscriber device.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
   at least one processor; and
   at least one memory coupled to the at least one processor, the memory having computer-executable instructions stored thereon that, when executed by the at least one processor, cause the system to:
   electronically identify one or more subscriber accounts for a network, wherein each subscriber account of the one or more subscriber accounts is associated with a subscriber, and wherein the network is a telecommunications network that includes a plurality of network systems and provides networking functionality to one or more subscriber devices associated with the subscriber accounts, the plurality of network systems including a network core that includes one or more functions for allowing the subscriber devices to access the telecommunications network, the network core being a system that is not a subscriber device;
   electronically receive an indication that a subscriber account of the one or more subscriber accounts is to be secured;
   electronically generate authentication information for the subscriber account;
   electronically cause a subscriber device associated with the subscriber account to display the authentication information to a user;
   electronically receive, by the network core, an indication that a change is requested for the subscriber account;
   electronically receive, within the network core, data indicating whether the change is to be made for the subscriber account;
   electronically receive, within the network core, authentication information usable to authenticate that the data was received from the subscriber associated with the subscriber account;
   electronically authenticate, within the network core, that the data was received from the subscriber based on the authentication information; and
   electronically cause the change to be applied to the subscriber account based on the results of the authentication that the data was received from the subscriber and the indication of whether the change is to be made for the subscriber account.

2. The system of claim 1, wherein the indication that a change is requested for a subscriber account is obtained via user input.

3. The system of claim 1, wherein the authentication information includes one or more of: a passphrase, a pin code, a software token, and a hardware token.

4. The system of claim 3, wherein the system electronically authenticates that the data was received from the subscriber by using two-factor authentication.

5. The system of claim 3, wherein the system is further caused to:
electronically change the authentication information required to authenticate that the data was received from the subscriber after a predetermined time period has elapsed.

6. The system of claim 1, wherein the authentication information and the data indicating whether the change is to be made are received from a subscriber device controlled by the subscriber.

7. The system of claim 6, wherein the data indicating whether the change is to be made includes the authentication information.

8. The system of claim 6, wherein the system is further caused to:
electronically cause the subscriber device to display the change that is requested for the subscriber account.

9. The system of claim 1, wherein the system is further caused to:
electronically generate one or more authentication codes for the subscriber account;
electronically indicate the one or more authentication codes to the subscriber; and
electronically authenticate that the data was received from the subscriber based on a comparison of the generated authentication codes to the authentication information.

10. The system of claim 9, wherein the generated authentication codes are unable to be used to authenticate that data is received from the subscriber after they have been used to authenticate that data is received from the subscriber a predetermined number of times.

11. A method in a telecommunication network core of a telecommunication network, wherein the network core is a part of the telecommunication network and is distinct from subscriber devices that connect to the telecommunication network, the method comprising:
receiving an indication that a subscriber account of one or more subscriber accounts is to be secured, each subscriber account being associated with a subscriber;
generating authentication information for the subscriber account;
causing a subscriber device associated with the subscriber account to display the authentication information;
receiving, by the network core, an indication that a change is requested for the subscriber account;
receiving, by the network core, data indicating that the change is to be made for the subscriber account;
receiving, by the network core, authentication information usable to authenticate that the data was received from the subscriber associated with the subscriber account;
authenticate, by the network core, that the data was received from the subscriber based on the authentication information; and
cause the change to be applied to the subscriber account, by the network core, via the one or more functions, based on the results of the authentication that the data was received from the subscriber and the indication of whether the change is to be made for the subscriber account.

12. The method of claim 11, further comprising:
displaying, to the subscriber, a user interface indicating the change which is to be made to the subscriber account;
receiving, via the user interface, user input indicating whether the change is to be made for the subscriber account; and
receiving, via the user interface, user input indicating the authentication information.

13. The method of claim 11, wherein the authentication information includes one or more of: a passcode, a pin, a hardware token, and a software token.

14. The method of claim 11, wherein the indication that a change is requested for the subscriber account is received from a network system.

15. The method of claim 11, wherein the indication that a change is requested for the subscriber account is received from the subscriber device.

16. The method of claim 11, further comprising:
generating one or more authentication codes for the subscriber account;
causing the subscriber device associated with the subscriber account to display the one or more authentication codes; and
authenticating that the data was received from the subscriber based on a comparison of the generated authentication codes to the authentication information.

17. A non-transitory processor readable storage medium storing instructions that, when executed by one or more processors, cause the one or more processors to perform a method comprising:
receiving an indication that a subscriber account of one or more subscriber accounts is to be secured, each subscriber account being associated with a subscriber;
generating authentication information for the subscriber account;
causing a subscriber device associated with the subscriber account to display the authentication information;
receiving, by a network core, an indication that a change is requested for the subscriber account, the network core being a telecommunication network core of a telecommunication network, wherein the network core is a part of the telecommunication network and is distinct from subscriber devices that connect to the telecommunication network;
receiving, by the network core, data indicating that the change is to be made for the subscriber account;
receiving, by the network core, authentication information usable to authenticate that the data was received from the subscriber associated with the subscriber account;
authenticate, by the network core, that the data was received from the subscriber based on the authentication information; and
cause the change to be applied to the subscriber account, by the network core, via the one or more functions, based on the results of the authentication that the data was received from the subscriber and the indication of whether the change is to be made for the subscriber account.

18. The non-transitory processor readable storage medium of claim 17, wherein the method further comprises:
generating one or more authentication codes for the subscriber account;
causing the subscriber device associated with the subscriber account to display the one or more authentication codes; and
authenticating that the data was received from the subscriber based on a comparison of the generated authentication codes to the authentication information.

19. The non-transitory processor readable storage medium of claim 18, wherein the generated authentication codes are unable to be used to authenticate that data is received from the subscriber after they have been used to authenticate that data is received from the subscriber a predetermined number of times.

\* \* \* \* \*